(12) United States Patent
Dejkoonmak et al.

(10) Patent No.: US 8,526,142 B1
(45) Date of Patent: Sep. 3, 2013

(54) HARD DISK DRIVE DSA SUSPENSION HAVING PZT ENCAPSULATION DAM

(75) Inventors: Kongsak Dejkoonmak, Ayutthaya (TH); Johnathan Phu, San Gabriel, CA (US)

(73) Assignee: Magnecomp Corporation, Murrieta, CA (US)

( * ) Notice: Subject to any disclaimer, the term of this patent is extended or adjusted under 35 U.S.C. 154(b) by 227 days.

(21) Appl. No.: 13/182,685

(22) Filed: Jul. 14, 2011

Related U.S. Application Data (60) Provisional application No. 61/428,829, filed on Dec. 30, 2010.

(51) Int. Cl.
*G11B 5/56* (2006.01)

(52) U.S. Cl.
USPC ........................................................ 360/294.4

(58) Field of Classification Search
USPC .......... 360/244.5, 244.7, 294.1, 294.2, 294.3, 360/294.4
See application file for complete search history.

(56) References Cited

U.S. PATENT DOCUMENTS

| | | | | |
|---|---|---|---|---|
| 6,108,175 A * | 8/2000 | Hawwa et al. | ............. | 360/294.4 |
| 6,201,668 B1 * | 3/2001 | Murphy | .................... | 360/294.4 |
| 6,335,849 B1 | 1/2002 | Khan et al. | | |
| 6,594,104 B2 | 7/2003 | Tokuyama et al. | | |
| 6,597,541 B2 * | 7/2003 | Nishida et al. | ............. | 360/294.4 |
| 6,661,619 B2 | 12/2003 | Nishida et al. | | |
| 6,856,075 B1 | 2/2005 | Houk et al. | | |
| 6,870,377 B2 | 3/2005 | Thomsen | | |
| 7,038,888 B2 * | 5/2006 | Ma | ............................ | 360/294.4 |
| 7,110,224 B2 * | 9/2006 | Nakamura et al. | ......... | 360/294.1 |
| 7,211,935 B1 | 5/2007 | Houk | | |
| 7,417,830 B1 * | 8/2008 | Kulangara | ................. | 360/294.4 |
| 7,612,968 B1 | 11/2009 | Guo et al. | | |
| 7,658,001 B1 | 2/2010 | Houk | | |
| 7,751,153 B1 | 7/2010 | Kulangara et al. | | |
| 8,174,797 B2 | 5/2012 | Iriuchijima | | |
| 8,248,736 B2 * | 8/2012 | Hanya et al. | ............... | 360/294.4 |
| 8,295,012 B1 * | 10/2012 | Tian et al. | .................. | 360/245.4 |
| 2010/0177445 A1 | 7/2010 | Fuchino | | |

* cited by examiner

*Primary Examiner* — Angel Castro
(74) *Attorney, Agent, or Firm* — Intellectual Property Law Offices of Joel Voelzke, APC (57) ABSTRACT

A dual stage actuated (DSA) suspension includes a dam-like structure that holds epoxy along the outside lateral side of the PZT microactuators while that epoxy hardens. In the illustrative embodiment, the dam-like structure is in the form of a wing rail that is integrally formed with the suspension base plate, and extends parallel to the outside face of the PZT. The wing rail has an upturned edge to help contain the epoxy while it hardens. The wing rail has springs at its fore and aft ends so that the rail does not unduly limit movement of the PZTs and hence microactuator stroke length. The wing rail does not touch the PZT electrodes. The encapsulation dam allows epoxy to be dispensed after the PZT has been located on the suspension, so as to substantially cover all sides of the PZT and thus prevent the shedding of contaminating particles during operation.

19 Claims, 6 Drawing Sheets

HARD DISK DRIVE DSA SUSPENSION HAVING PZT ENCAPSULATION DAM

CROSS-REFERENCE TO RELATED APPLICATIONS

This application claims priority from U.S. Provisional Patent Application Ser. No. 61/428,829 filed Dec. 30, 2010.

BACKGROUND OF THE INVENTION

1. Field of the Invention

This invention relates to the field of suspensions for disk drives. More particularly, this invention relates to the field of a hard disk drive (HDD), dual stage actuation (DSA) suspension having a PZT encapsulation dam formed in the suspension.

2. Description of Related Art

Figure 1:
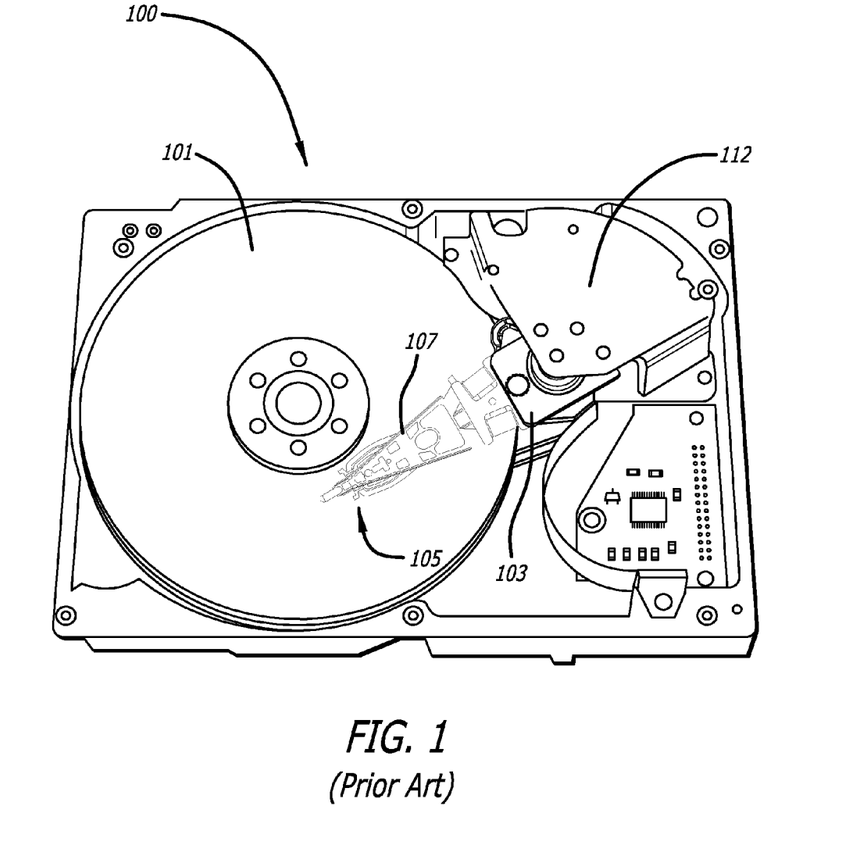
FIG. 1 is an oblique view of an exemplary prior art hard disk drive and DSA suspension.

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. Suspension 105 is coupled to an actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105. In DSA suspensions, in addition to voice coil motor 112 which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider.

Figure 2:
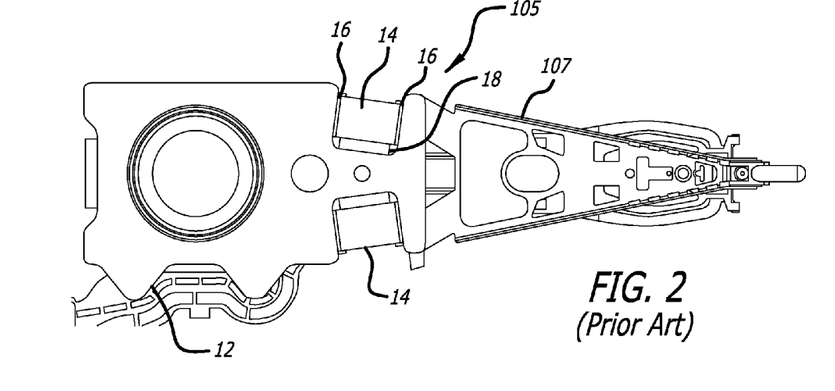
FIG. 2 is a top plan view of the suspension 105 of FIG. 1.
Figure 3:
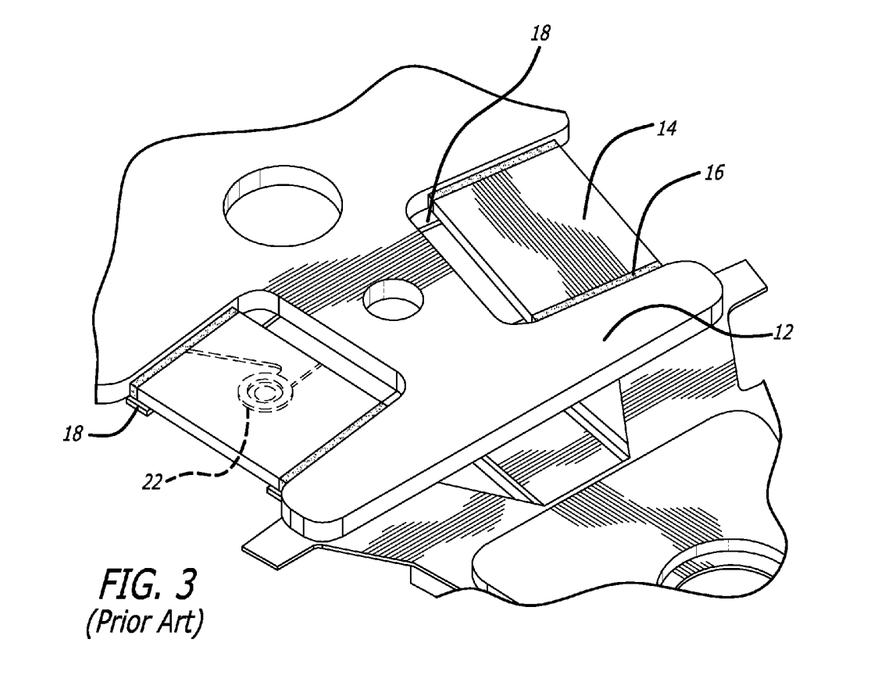
FIG. 3 is an oblique closeup view of the prior art suspension 105 of FIG. 2 in the area around microactuators 14.

FIG. 2 is a top plan view of suspension 105, which is a representative prior art DSA suspension, and FIG. 3 is a close-up view thereof in the area around microactuators 14. Two piezoelectric lead zirconate titanate (PZT) microactuators 14 are affixed to suspension 105 on microactuator mounting shelves 18 that are formed within base plate 12, such that the PZTs span respective gaps in base plate 12. Microactuators 14 are affixed to mounting shelves 18 by non-conductive epoxy 16 at each end of the microactuators. The positive and negative electrical connections can be made from the PZTs to the suspension's flexible wiring trace and/or to the grounded base plate by a variety of techniques including those disclosed in commonly owned U.S. Pat. No. 7,751,153 to Kulangara et al., U.S. Patent Publication 2010/0177445 by Fuchino, and U.S. Patent Publication No. US 2009/00886379 by Hanya et al. An exemplary electrical connection 22 is shown in FIG. 3. The electrical connections to the PZT are a matter of design choice according to known techniques, and will not be shown or described further herein. Other examples of DSA suspensions are given in U.S. Pat. No. 6,661,619 to Nishida et al., and U.S. Pat. No. 6,594,104 to Tokuyama et al.

Figure 4:
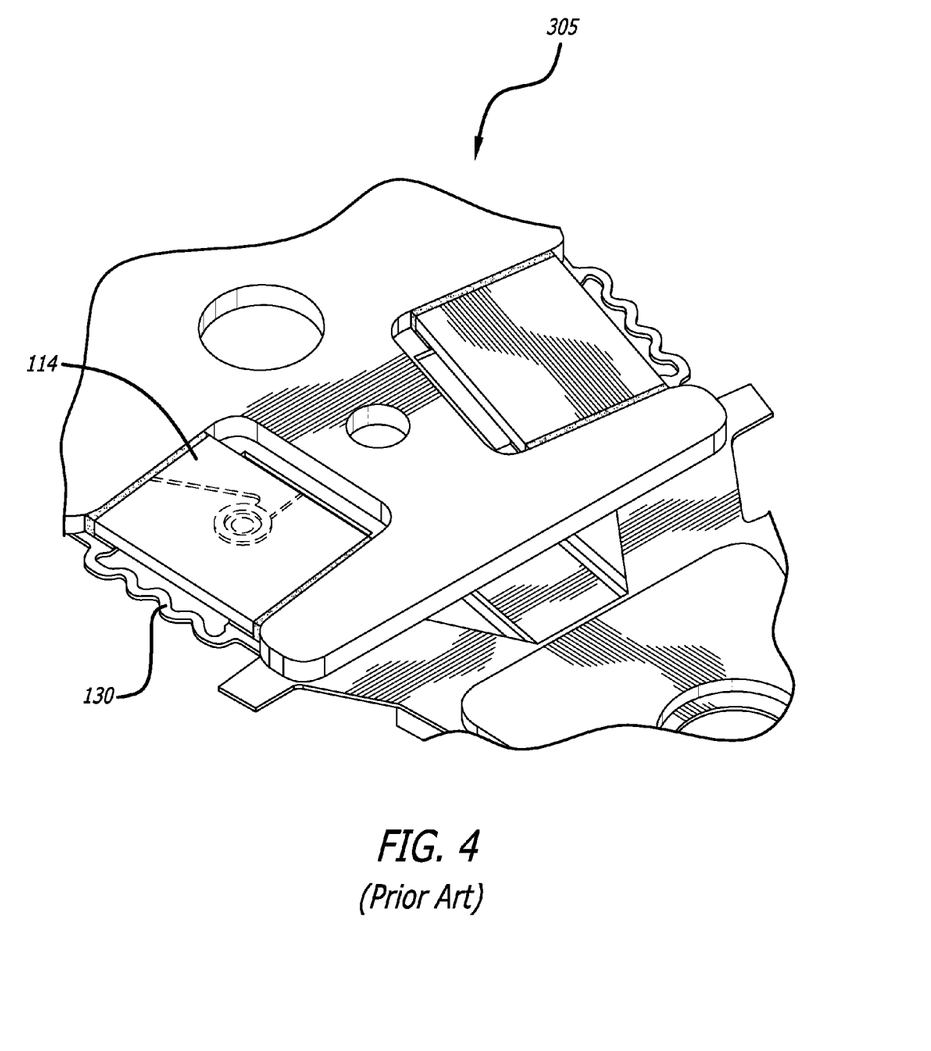
FIG. 4 is an oblique view of the area around the microactuators in another prior art suspension.

FIG. 4 is an oblique view of the area around the microactuators in another prior art suspension 305. This suspension is similar to the suspension of FIG. 3 and includes a serpentine spring 130 that helps the suspension return to its nominal state when the PZTs are not energized.

In the prior art, microactuators on HDD suspensions have often been placed on the base plate or other base portion of the suspension. Probably less common are DSA suspensions in which the microactuator is placed on the load beam itself, including close to the head slider or even underneath the head slider. The microactuators in DSA suspensions are often, although not exclusively, piezoelectric devices such as lead zirconate titanate (PZT) crystals. The PZT microactuators normally take the form of relatively thin wafers having a square or rectangular shape when viewed from the top.

One drawback suffered by DSA suspensions having PZT microactuators is that, in operation, the PZT crystals can shed small particles especially from the sides. These small particles can contaminate the disk drive assembly causing scratches on the surface of the spinning disk platter when the particles come between the magnetic head slider and the surface of the disk on which the data is stored.

One solution previously proposed is to encapsulate the sides of the PZT using epoxy or similar material. An example of such a solution is presented in U.S. Pat. No. 6,393,681 to Summers, which is assigned to the assignee of the present application.

SUMMARY OF THE INVENTION

The present invention is of a DSA suspension for hard disk drives and the like, in which the suspension has a dam-like wing rail or other features for containing PZT encapsulation material such as epoxy, and related methods of manufacture.

According to the invention, a DSA suspension is provided with additional structures that help to hold a flexible non-conductive adhesive as it hardens so that that adhesive can be applied to encapsulate the sides of the PZT microactuators, yet at the same time allow sufficient flexibility of the suspension structure so that the stroke length of the PZT microactuators is not unduly reduced.

In one aspect, the invention is of a dual stage activated (DSA) suspension having an adhesive containment side rail on the outward side of the PZT and extending generally parallel to the outward side of the PZT. The adhesive containment rail is close enough to the PZT, such as less than 0.6 mm, so as to hold adhesive such as encapsulating non-conductive epoxy between the PZT and the rail while the epoxy hardens so that the epoxy does not drip down between the rail and the PZT. The rail, however, does not directly touch the PZT which would create a short circuit. The rail can have a portion that is bent upwards in order to help contain the epoxy. The rail has one or more strain relief features, such as C- or S-shaped springs formed in it such as at the fore and aft ends of the rail, so that the rail which is adhered to the side of the PZT does not unduly limit the stroke length of the PZT during operation of the disk drive and the microactuator. The side rail is preferably formed integrally with the portion of the suspension such as the base plate where the PZT is located, such as by etching during the normal manufacturing process. The receiving cavity also has a ledge on the inside of the PZT, and the PZT is placed close enough to that ledge such that epoxy does not drip between the PZT and the ledge as the epoxy hardens. In this way, the base plate can be fabricated to have a recess therein that receives the PZT onto a pair of PZT mounting shelves, with integral structures close to the inner and outer faces of the PZT that help contain epoxy around the inner and outer faces of the PZT. During the manufacturing process, the PZT is placed and adhered into the PZT receiving cavity in the base plate, then non-conductive epoxy is dispensed around all four side faces of the PZT thus fully encapsulating the four side faces of the PZT. The epoxy then hardens, and prevents the PZT from shedding contaminating particles during operation. The containment rail thus acts as a dam-like structure to help hold the epoxy as it hardens around the PZT, yet remains resiliently movable so as not to unduly interfere with expansion and contraction of the PZT during operation.

In another aspect, the invention is of a process for manufacturing a DSA suspension, the process including the steps of forming integral with the suspension a basin-like structure on all exposed sides of the PZT crystals, the basin like structure being in sufficiently close proximity to the PZTs to contain a non-conductive flowable and hardenable adhesive without that adhesive dripping while it hardens; causing that flowable adhesive to flow around at least one exposed face of the PZT so as to substantially encapsulate that face; and then allowing that adhesive to harden. The step of forming a basin-like structure can include forming a dam-like structure including a wing rail having an edge bent so that it is upturned at an angle of between 75 and 90 degrees, the upturned portion extending in the longitudinal direction of the suspension for at least 60% of the length of the PZT, in order to contain the adhesive while it hardens.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 5:
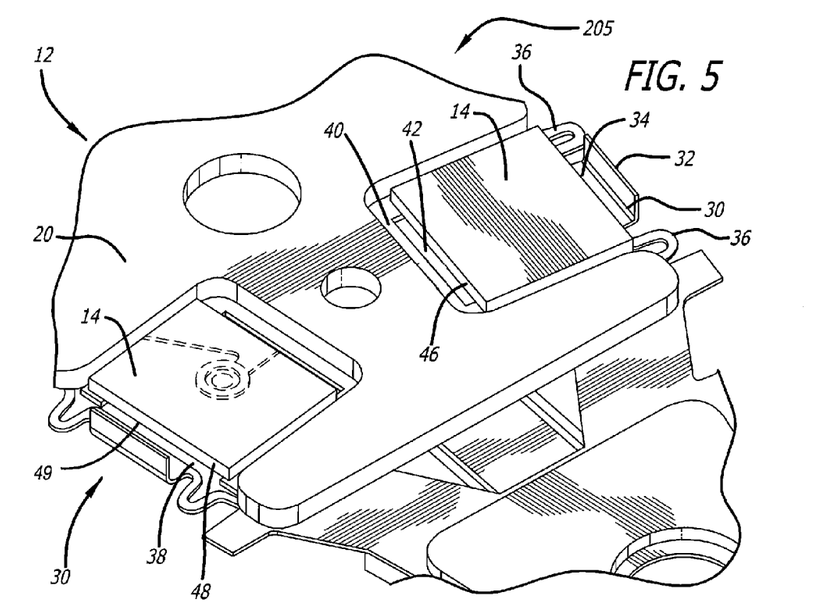
FIG. 5 is an oblique view of a suspension in the area around the microactuators according to a first embodiment of the present invention, before encapsulation adhesive has been added.
Figure 6:
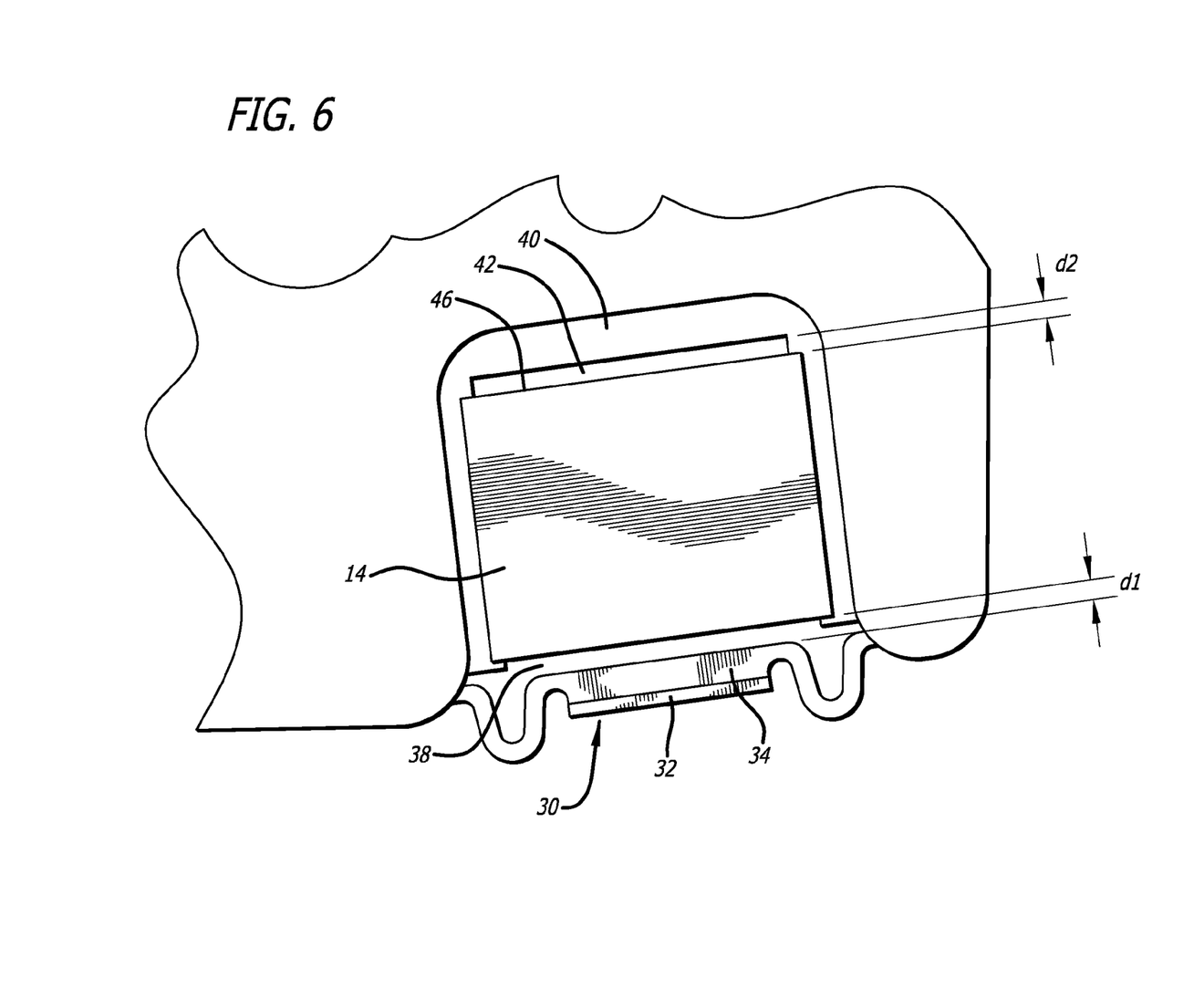
FIG. 6 is a top plan closeup view of the suspension of FIG. 5.

FIG. 5 is an oblique view of a suspension 205 according to a first embodiment of the invention, and FIG. 6 is a top plan closeup view thereof. Suspension body portion 20, which in the illustrative embodiment is base plate 12 but alternatively could also be a different part of the suspension such as the load beam, includes a pair of integrally formed wing rails 30 outward of the PZTs that help to contain a non-conductive adhesive (not shown in these figures) such as epoxy, and thus serve as adhesive containment rails. The epoxy is preferably at least somewhat elastic. Although other shapes are possible, in the embodiment shown the adhesive containment rails 30 include substantially horizontal and substantially flat sections 34, bent or upturned sides 32, and relief features or resilient features 36 such as C-shaped or S-shaped springs, or other shape containing one or more curved section such as serpentine shaped sections. In the preferred embodiment, containment rail 30 is formed integral with suspension body portion 20, and has integrally formed springs 36 proximate opposite ends of containment rail 30.

Rails 30 are disposed generally laterally to the outside of, and extend generally parallel to, outside lateral surface 48 of PZT 14 without directly touching PZT 14. Thus, PZT 14 has a laterally outwardmost face that is adjacent to but does not touch side rail 30. Additionally, on the insides of the PZTs, the base plate 12 includes narrow flat PZT mounting shelves 40 which extend generally parallel to inside lateral surfaces 46 of PZTs 14. The terms "inside lateral surface" 46 and "outside lateral surface" 48 are relative to the longitudinal axis L-L of suspension 205 (FIG. 8); that is, inside lateral surface 46 is closest to longitudinal axis L-L, and outside lateral surface 48 is farthest away from longitudinal axis L-L.

As can be seen in the figure, for a majority of the length of its outside lateral face 48 PZT 14 is unsupported underneath. That is, the bottom edge 49 of outside lateral face 48 is unsupported underneath along most its length.

For simplicity of discussion, microactuators 14 will sometimes be referred to as simply PZTs, although it will be understood that the invention is not necessarily limited to use with PZT type microactuators.

On the outside surface of PZT 14, flat section 34 together with the upturned side 32 of wing rail 30 and the generally vertical outside lateral side surface 48 of PZT 14, serve to cradle and hold elastic non-conductive adhesive 16 after it is poured in liquid or semi-liquid form and while it is hardening, so that adhesive 16 does not drip through gap 38 before adhesive 16 has hardened. Upturned sides 32 help to ensure that, if the non-conductive adhesive flows as far as sides 32 before it hardens, then adhesive 16 will contact upturned sides 32, but upturned sides 32 will prevent adhesive 16 from flowing any farther. Surface tension and viscosity of adhesive 16 also helps to prevent that adhesive from dripping into gap 38 before it has hardened. Upturned sides thus act as containment walls to contain adhesive 16 until it hardens. Preferably upturned side 32 has a height that is at least 60% of the thickness of PZT 14, and preferably upturned side 32 rises at least as high as the top surface of PZT 14.

Similarly, on the inside surface of PZT 14, mounting shelf 40 together with the adjacent generally vertical inside surface of the mounting recess within base plate 12 and the inside lateral side surface 46 of PZT 14, serve to cradle and hold elastic non-conductive adhesive 16 after it is poured in liquid or semi-liquid form and while it is hardening, so that adhesive 16 does not drip through gap 42 before adhesive 16 has hardened. The mounting recess may be formed into base plate 12 such as by etching.

Relief feature or features 36 give the overall formed wing rail 30 flexibility so that it can move horizontally in response to the PZT expanding and contracting in operation.

As shown in the illustrative embodiment, there is a small gap 42 between inside lateral side surface 46 of PZT 14 and PZT mounting shelf 40 that is narrow enough to prevent non-conductive epoxy 16 from dripping through that gap while the epoxy is hardening. Similarly, gap 38 between the outside lateral side surface 48 of PZT 14 and the formed wing rail 30 prevents non-conductive epoxy from dripping into that gap while the epoxy is hardening. Additionally, the vertical sides of the base plate adjacent shelf 40 on the inside of the PZT, and the upturned portion 32 on formed wing rail 30 on the outside of the PZT, cause capillary or wicking action that helps prevent the epoxy from dripping through gaps 38 and 42 while the epoxy is hardening. Upturned portion 32 also prevents the epoxy from flowing over the end of flat portion 34 that would otherwise be the outermost extent of wing rail 30. Thus, the combination of the small gap sizes, the upturned portion 32 and the vertical edge of the PZT recess, the viscosity of the liquid epoxy, and the surface tension of that epoxy, in whatever combination the design engineer chooses, prevents liquid epoxy from flowing through gaps 38 and 42 while that epoxy is hardening. At the same time, the existence of gaps 38 and 42 prevent the PZT bottom surface which serves as an electrode of the PZT, from short circuiting to either formed wing rail 30 on the outside or mounting shelf 40 on the inside. Gaps 38 and 42 also prevent the PZT from being directly anchored via the epoxy to those surfaces which would cause those surfaces to resist the expansion and contraction of the PZT, which in turn would reduce the effective stroke length of the PZT per unit of PZT activation voltage. It is currently contemplated that gaps 38 and 42 should have gap distances d1 and d2, respectively, of less than 0.6 mm wide, and in the range of 0.01-0.30 mm wide, and more particularly in the range of 0.05 mm-0.10 mm wide, when used with conventional epoxies in order to achieve the desired results.

Figure 7:
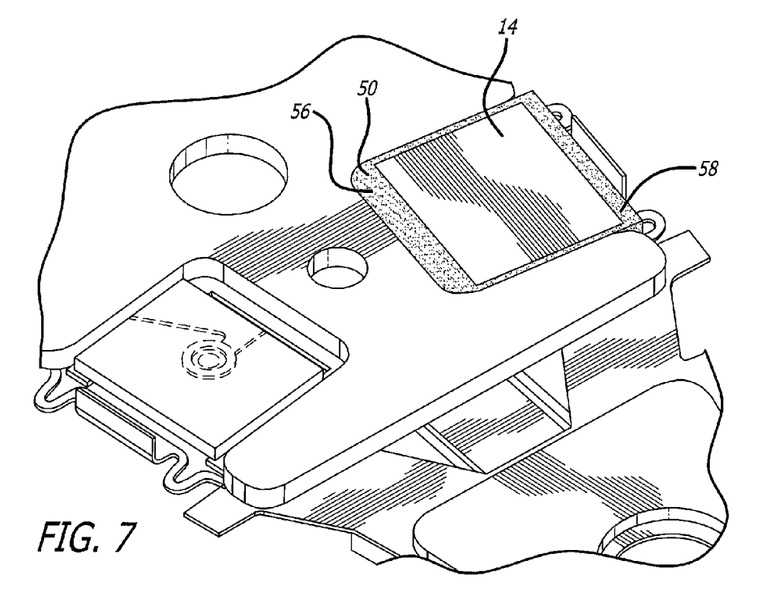
FIG. 7 shows the suspension of FIG. 5 after encapsulation adhesive 50 has been added to one side.
Figure 8:
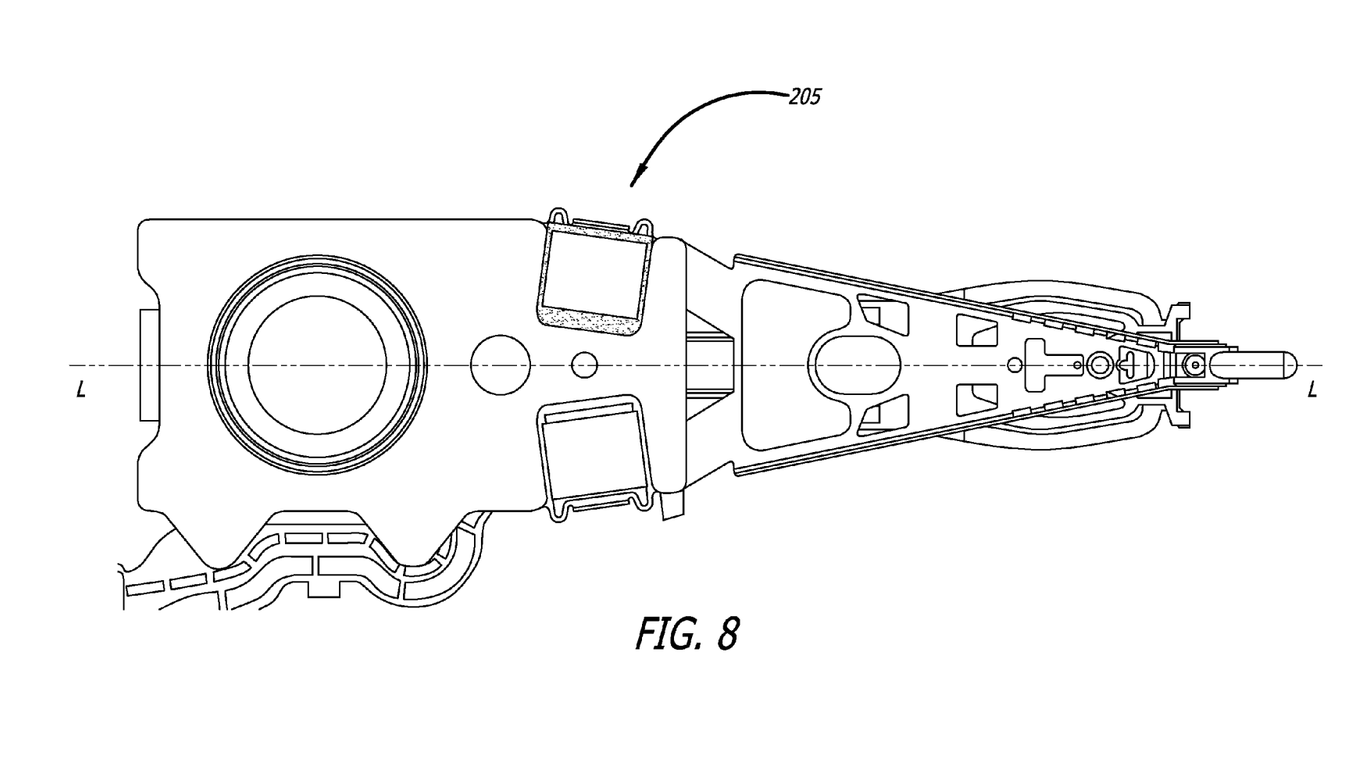
FIG. 8 is a top plan view of the entire suspension of FIG. 7.

FIG. 7 shows suspension 205 of FIG. 5 but with non-conductive epoxy 50 now added on one side of the suspension. FIG. 8 shows the entire suspension 205 of FIG. 7 rather than merely the closeup of FIG. 7, and shows longitudinal axis L-L of suspension 205. As can be seen, formed wing rail 30 helps to form a dam or basin that sufficiently contains the non-conductive PZT encapsulation epoxy while that epoxy is hardening. Similarly, shelf 40 helps to form a dam or basin that sufficiently contains the non-conductive PZT encapsulation epoxy while that epoxy is hardening. Although it is currently contemplated that non-conductive epoxy 56 on the inside of PZT 14 will be the same epoxy as non-conductive epoxy 58 on the outside of PZT 14, and will be dispensed at the same time, those two masses of epoxy need not strictly be the same material. For purposes of discussion, however, those two masses of epoxy will simply be referred to as non-conductive epoxy 50.

Non-conductive epoxy 50 is thus dispensed on all sides of each PZT 14, and thus serves as an encapsulation adhesive to substantially cover and encapsulate preferably all four sides of the PZT including its inside and outside lateral side surfaces 46 and 48. The encapsulation adhesive 50 is contained within the spaces formed between the four PZT peripheral surfaces, and the four walls surrounding the PZT comprising the adhesive containment rail 30 including upturned portion 34, and the three vertical walls formed into suspension body 20 at the edges of the recess in which PZT 14 is located. Each side face of PZT 14 is at least partially adhered by adhesive 50 to its adjacent suspension body wall or to wing rail 30, thus substantially encapsulating all sides of PZT 14 in order to reduce or eliminate particle shedding from all four sides. PZTs 14 could theoretically have more than four sides each, in which case encapsulation adhesive 50 would preferably cover all of those sides.

According to the preferred manufacturing method, therefore, PZT 14 is placed within a recess within suspension body 20, suspension body 20 substantially surrounding PZT 14 so as to act as an encapsulation adhesive dam, suspension body 20 including a resilient feature that allows at least a portion thereof to move longitudinally as PZT 14 expands and contracts. After PZT 14 has been placed within its receiving cavity in suspension body 20, encapsulation adhesive 50 is dispensed so that substantially all four vertical faces of PZT 14 are encapsulated thereby reducing particulate shed from PZT 14 during operation of the disk drive.

Non-conductive epoxy 50 is sufficiently flexible enough so as to not unduly oppose expansion and contraction of the PZTs. During operation of the suspension and its PZT microactuators, the PZTs 14 can now expand and contract without shedding potentially destructive contaminating particles from their faces. As PZTs 14 expand and contract, strain relief features 36 such as the springs shown allow the overall rail 30 to expand and contract at those strain relief points, and thus also not unduly oppose expansion and contraction of the PZTs.

With respect to the upturned edges 32 of wing rails 30, and with manufacturing capabilities in mind, it is believed that the preferred angle of bend that forms the upturned edges 32 will be approximately 75-90 degrees relative to a top surface of the microactuator, i.e., relative to horizontal. It is currently believed that if the angle is less than 75 degrees, more epoxy will be drawn to the rail, resulting in more epoxy being needed to ensure adequate coverage by the epoxy of the outside edge of the PZT, i.e., to ensure adequate PZT encapsulation. Thus, the upturned edges 32 will be at least 60 degrees relative to the horizontal, and preferably at least 70 degrees relative to the horizontal, and more preferably approximately 75-90 degrees.

Because epoxy 50 is in contact with both the lateral faces 46 and 48 and their respectively adjacent side rails or adhesive containment rails 30, those lateral faces are adhered to their respectively adjacent portions of suspension body portion 20. In the preferred embodiment, at least 80% of the inside and outside lateral faces 46, 48 of PZT 14 are covered by epoxy 50, and at least 50% of the surface area of the outwardmost face 48 is adhered to side rail 30. Epoxy 50 at least partially fills gaps 38 and 42. Preferably, epoxy completely covers all of the lateral sides of PZT 14 to prevent escape of any contaminating particles from those sides.

Although the invention has been shown with respect to a DSA suspension in which dual PZT microactuators are located on base plate 12 or other base portion of a suspension which does not have a base plate per se, the invention can be applied, possibly with modifications as appropriate, to DSA suspension designs having only one PZT, or having more than two PZTs, or in which the PZT(s) are mounted somewhere on the load beam or on the head gimbal assembly.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," "below," "horizontal," and "vertical" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage activated (DSA) suspension having:
   a body portion;
   a microactuator having an inside lateral side surface and an outside lateral side surface relative to a longitudinal axis of the suspension, the microactuator spanning a gap in the body portion;
   an adhesive containment rail extending generally laterally to the outside of, and generally parallel to, the outside lateral side surface of the microactuator, the containment rail not directly contacting the microactuator, the outside lateral surface having a bottom edge thereof that is unsupported underneath along a majority of its length;
   adhesive material disposed between the outside lateral side surface of the microactuator and the containment rail such that the adhesive material is at least partially touching and contained by said rail and covers and encapsulates substantially all of said outside lateral side surface.

2. The DSA suspension of claim 1 wherein:
   the outside lateral side surface of the microactuator has a length thereof; and
   the containment rail is separated from the outside lateral side surface of the microactuator by a distance of less than 0.6 mm without touching said surface, for at least half of said length.

3. The DSA suspension of claim 1 wherein the containment rail has associated therewith a first spring that allows the containment rail to move longitudinally in response to the microactuator expanding and contracting.

4. The DSA suspension of claim 3 wherein the first spring is formed integrally with the containment rail.

5. The DSA suspension of claim 3 wherein the containment rail has associated therewith a second spring that allows the containment rail to move longitudinally in response to the microactuator expanding and contracting, the first and second springs being formed integrally with the containment rail and located proximate opposite ends thereof.

6. The DSA suspension of claim 1 wherein the containment rail has an edge bent upward at an angle of greater than 60 degrees relative to a top surface of the microactuator, the upwardly bent edge providing additional containment of the adhesive material.

7. A dual stage activated (DSA) suspension having:
   a body portion, the body portion having a longitudinally extending side rail formed integrally therewith; and
   a piezoelectric microactuator affixed to the body portion for microactuation of the suspension, the microactuator having a laterally outwardmost face that is adjacent to but does not directly touch the side rail, and which is unsupported underneath for a majority of a length of said laterally outwardmost face;
   wherein at least 50% of surface area of the outwardmost face of the microactuator is adhered to the side rail by an adhesive, the adhesive covering at least 80% of the outwardmost face.

8. The DSA suspension of claim 7 wherein the adhesive contacts an upturned portion of the rail.

9. The DSA suspension of claim 7 wherein the rail has:
   a substantially flat horizontal portion; and
   an upturned portion bent at an angle of at least 70 degrees from the horizontal portion; and
   wherein at least one strain relief is integrally formed with the rail for allowing movement thereof relative to the body portion of the suspension.

10. The DSA suspension of claim 9 wherein the strain relief comprises a plurality of curved portions.

11. The DSA suspension of claim 10 wherein the strain relief comprises two curved springs located on either side of the side rail.

12. The DSA suspension of claim 7 wherein the side rail is separated from an outer edge of the PZT by a gap having a width of 0.01-0.3 mm.

13. The DSA suspension of claim 12 wherein the gap has a width of 0.05-0.01 mm.

14. A dual stage activated (DSA) suspension having:
   a base portion, the base portion having:
      a recess therein;
      a microactuator disposed within the recess; and
      an adhesive dam integrally formed with the base portion and disposed adjacent a laterally outward face of the microactuator, the microactuator being unsupported underneath along a majority of a length of said laterally outward face, the adhesive dam not directly touching the microactuator and being separated therefrom by a gap;
   adhesive covering substantially all of said laterally outward face of the microactuator to prevent particulate shed from said microactuator face, the adhesive at least partially filling the gap between the microactuator and the adhesive dam.

15. The DSA suspension of claim 14 wherein the adhesive is adhered to at least part of the adhesive dam, and the gap between the microactuator and the adhesive dam is narrow enough to prevent adhesive from dripping through the gap before the adhesive hardens.

16. The DSA suspension of claim 14 wherein the adhesive dam includes a substantially horizontal portion and an upturned portion bent at an angle of at least 60° relative to the substantially horizontal portion, the upturned portion being located laterally outward of the substantially horizontal portion.

17. A dual stage activated (DSA) suspension having:
   a suspension body;
   a microactuator disposed at least partially within the suspension body, the microactuator having at least four sides;
   wherein:
   the suspension body has four walls integrally formed therewith, the four walls substantially surrounding all four sides of the microactuator, each of the four walls serving as a containment wall to contain adhesive on a respectively adjacent side of the microactuator such that the microactuator is substantially encapsulated by adhesive on all four of its sides to reduce particulate shedding therefrom, each side of the microactuator being at least partially adhered by the adhesive to its adjacent suspension body wall; and one of said suspension body walls is located laterally outward of the microactuator, and is integrally formed with at least one resilient feature that allows that wall to move longitudinally as the microactuator expands and contracts.

18. The DSA suspension of claim 17 wherein the at least one resilient feature comprises a spring.

19. The DSA suspension of claim 17 wherein one of said suspension body walls is located laterally outward of the microactuator, and has a height that is at least 60% of a thickness of the microactuator.

* * * * *